J. K. PAYNE.
AUTOMOBILE SIGNAL.
APPLICATION FILED MAY 29, 1916.
1,215,845.
Patented Feb. 13, 1917.
2 SHEETS—SHEET 1.
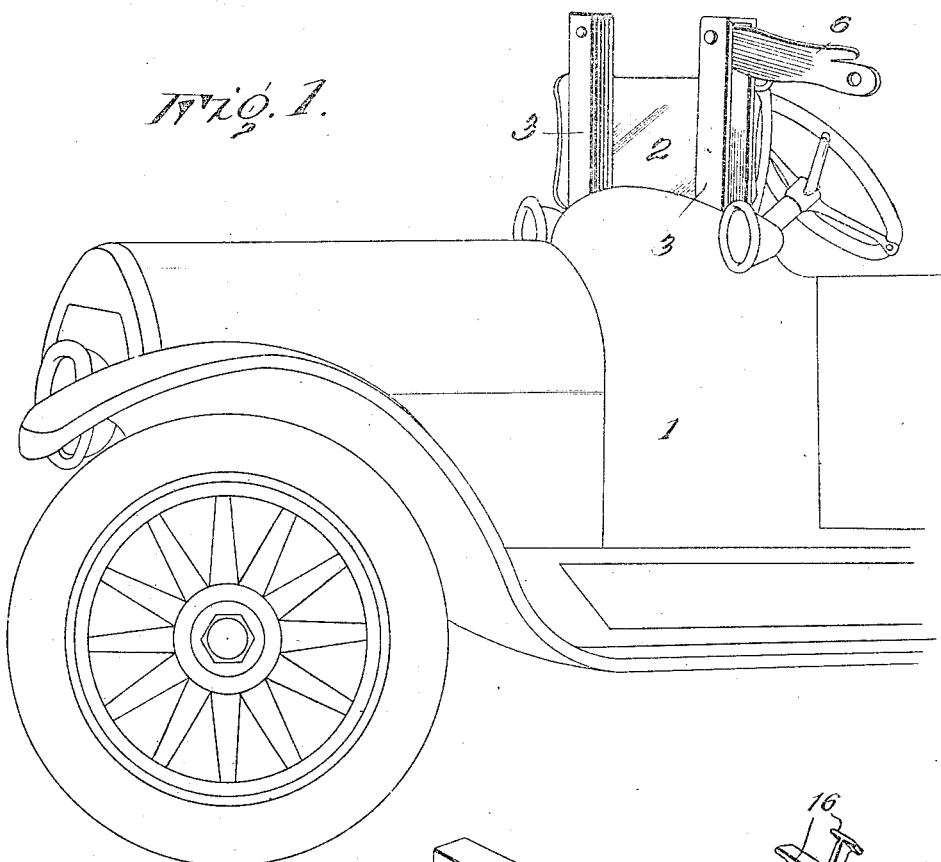
Fig. 1.
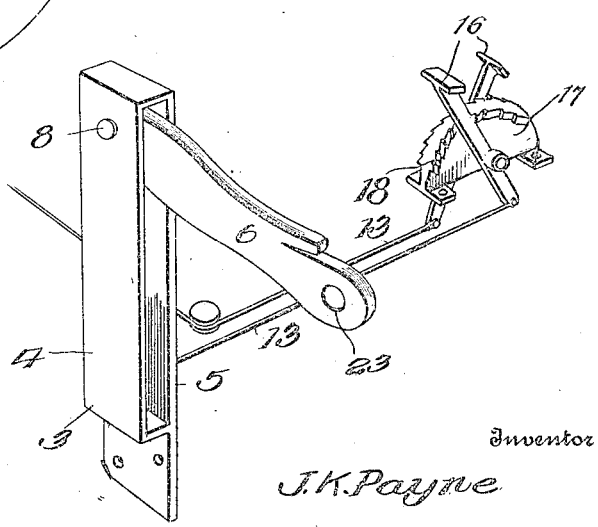
Fig. 2.
Inventor
J. K. Payne
By , Attorneys J. K. PAYNE.
AUTOMOBILE SIGNAL.
APPLICATION FILED MAY 29, 1916.
1,215,845.
Patented Feb. 13, 1917.
2 SHEETS—SHEET 2.
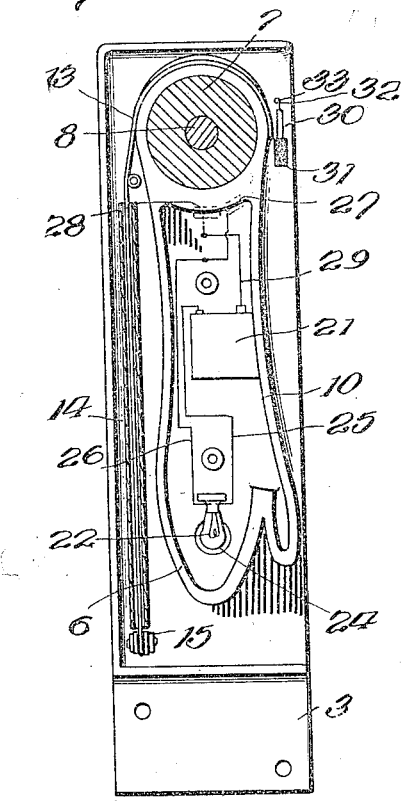
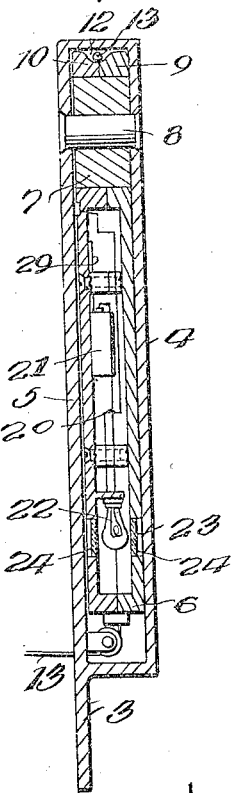
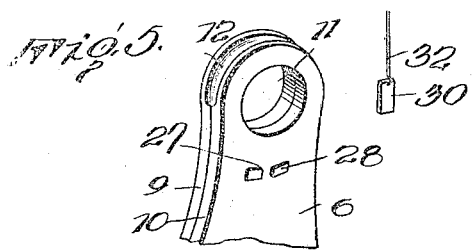
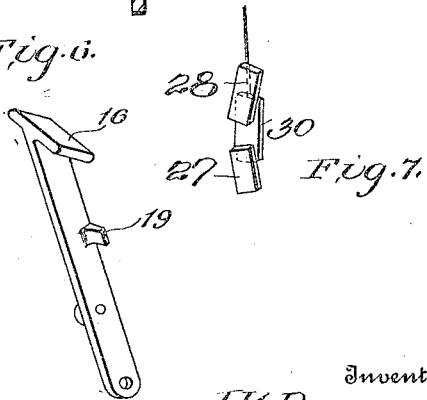
Inventor
J. K. Payne

UNITED STATES PATENT OFFICE.

JAMES K. PAYNE, OF SANTA BARBARA, CALIFORNIA.

AUTOMOBILE-SIGNAL.

1,215,845.   Specification of Letters Patent.   Patented Feb. 13, 1917.

Application filed May 29, 1916. Serial No. 100,667.

*To all whom it may concern:*

Be it known that I, JAMES K. PAYNE, a citizen of the United States, residing at Santa Barbara, in the county of Santa Barbara and State of California, have invented certain new and useful Improvements in Automobile-Signals, of which the following is a specification.

This invention relates to signals for automobiles and has for its object the provision of a simple, efficient, and easily operated device, whereby the chauffeur may indicate positively to occupants of following cars the direction in which he is to turn when approaching a corner. A secondary object of the invention is to provide a signal for the stated purpose which may be operated from the floor of the car without requiring the chauffeur to release his hold upon the steering wheel or assume a position which will prevent his control of the brake lever or any other of the operative parts, and a further object of the invention is to provide a device which may be observed at night as well as in the day.

The invention is illustrated in the accompanying drawings and consists in certain novel features which will be first fully described and then particularly pointed out in the claims following the description.

In the drawings:—

Figure 1 is a perspective view of a portion of an automobile having my improved signal mounted thereon;

Fig. 2 is a detail perspective view of the indicator arm and its mounting and treadles which may be manipulated to actuate the indicator arm;

Fig. 3 is a front elevation partly in section of my improved signal;

Fig. 4 is a transverse section of the same;

Fig. 5 is a group of detail perspective views of a circuit closer which may be employed in connection with my signal.

Fig. 6 is a detail perspective view of a treadle.

Fig. 7 is a detail view of the circuit-closer in closed position.

In the drawings, the reference numeral 1 indicates the forward portion of the automobile body and 2 indicates the wind shield thereon which may be of any desired construction. In carrying out my invention, I secure to the dash, or to the end frames of the wind shield, standards 3 which are slotted or constructed with branches, indicated at 4 and 5 to accommodate an indicator arm 6 which normally lies between the members 4 and 5 of the standard and is hidden from view by the same. It will be understood that the standards 3 are duplicated and one standard is provided at each side or end of the wind shield and each standard carries an indicator arm with the parts mounted thereon so that the following description is to be held as applicable to either standard and the parts mounted thereon. The parts 4 and 5 of the standards may be connected in any convenient or preferred manner and between the upper ends of said members I provide a circular boss or stud 7 upon which the indicator arm is pivotally hung, a securing pin or rivet 8 being inserted through the said boss or stud and the members of the standard to secure the parts together. The indicator arm 6 is constructed of mating members, as most clearly shown at 9 and 10 in Fig. 5, and these members are provided at their inner ends with circular transverse openings 11 which are adapted to engage around the boss or studs 7 so as to pivotally suspend the indicator arm upon the said boss. The pivotal end of the arm is circular and is provided with a groove 12 in which is received the end of a cable 13 which has its extremity secured to the indicator arm. The said cable passes through a guide tube 14 secured upon the rear face of the standard 4 and then passes to a pulley or guide roller 15 on the standard immediately adjacent the lower end of said tube after which the cable passes rearwardly over the floor of the car to the lower end of a treadle or foot lever 16. This treadle or foot lever is fulcrumed upon a bracket 17 secured rigidly to the floor of the car and having a notched or ratcheted upper edge 18 adapted to be engaged by a dog 19 carried by the treadle. This dog by its engagement with the ratchet or notched edge 18 will prevent premature retrograde movement of the treadle and will, consequently, hold the indicator arm in signaling position until positively released by the chauffeur. This dog 19 may be of any preferred or convenient form. I will generally construct the treadle with a lateral tooth or projection which will ride over the rack on a forward movement of the treadle but which will engage the rack upon backward movement of the same. The treadle may be resilient or resiliently mounted or may be otherwise constructed to meet the preference of users of the device, the exact manner of constructing the lever or treadle being immaterial as long as it may be readily released from the rack and permitted to move backwardly when it is desired to return the indicator arm to its lowered position. For convenience of operation, the cables 13 controlling both indicator arms are brought near together and connected with the treadles 16 which, as shown in Fig. 2, are mounted upon opposite sides of the duplicate brackets 17. It will be understood that the treadle disposed at that side toward which the car is to be turned will be manipulated to raise the corresponding arm and cause the same to project laterally from its supporting standard, as shown in Fig. 1, and thereby attract the attention of the occupants of following cars so that collisions may be avoided.

The mating members of the indicator arm are recessed on their inner opposed faces so that the arm is hollow and prevents an internal cavity 20. To one of the members, within the said cavity, I secure an electric battery 21 and within the said cavity, near the free end of the arm, I support an electric lamp 22 which is disposed between openings 23 in the members of the arm and these openings are preferably glazed, as shown at 24. An electric conductor 25 extends from one terminal of the battery to one terminal of the lamp and a conductor 26 connects the opposite terminal of the lamp with a contact plate 27 forming one member of a circuit closer, a corresponding plate 28 forming another member of the circuit closer and being connected by a conductor 29 with the battery, as clearly shown. The contact plates 27 and 28 are spaced apart and are insulated in any convenient or preferred manner from the indicator arm within which they are secured so that, when the signal is used in day-light, the circuit will be broken and the lamp, of course, will not be lighted. To cause the lamp to automatically light when the signal is used at night, I provide the movable contact plate 30 which is slidably mounted in any convenient manner upon the standard 3 on which the indicator arm is pivotally hung. The contact plates 27 and 28 are, of course, on the rear face of the indicator arm and are so located that the arc described by said plates when the indicator arm is raised will carry them over the contact plate 30. When the signal is used in day-light the plate 30 will be permitted to drop behind a housing 31 of insulating material so that the plates 27 and 28 will not engage the plate 30 and, consequently, the circuit will not be closed. A cable 32 is secured to the plate 30 and extends upwardly therefrom through a guide 33 of any convenient character and then passes rearwardly in the car so that it may be conveniently reached by the chauffeur. When darkness falls the cable 32 is pulled slightly so that the contact plate 30 will be raised above the insulating housing 31 whereupon when the indicator arm is raised the contacts 27 and 28 will ride onto the plate 32 and, consequently, the circuit will be closed and the lamp lighted. When the arm is lowered the circuit will, of course, be automatically broken and the lamp extinguished.

It is thought the manner of using my device and the advantages derived from its use will be readily understood from the foregoing description, taken in connection with the accompanying drawings. Ordinarily the weight of the indicator arm with the battery and other parts mounted within the arm will cause the arm to hang vertically from its pivotal support so that it will lie between the members of the supporting standard and, consequently, will not be visible. When the chauffeur desires to turn to either side he presses forwardly upon the treadle or foot lever 16 disposed at that side toward which he is going to turn and a pull will thereupon be exerted upon the cable 13 which will be transmitted to the indicator arm and the said arm caused to swing about the pin or rivet 8 and extend laterally, as shown in Fig. 1. The indicator arm will be of sufficient size to be readily observed by persons in following cars and the movement of the arm in swinging upwardly to its laterally projecting position will naturally attract attention. As the indicator arm will point in the direction toward which the car is going to turn the operators of following cars will be warned so that they may readily steer their own cars so as to avoid collisions. When the car resumes a straight ahead course, the treadle will be released and the indicator arm will then, of course, drop into its normal pendant position within the lever on which it is hung.

The device is exceedingly simple in the construction and arrangement of its parts and may be readily operated without interfering with the operation of the steering wheel or any of the controlling mechanism. When in position it will occupy very little space and will not detract from the sightliness of any car to which it may be fitted.

Having thus described the invention, what is claimed as new is:

1. In an automobile signal, the combination of a support, a hollow indicator arm pivotally hung on the support, means for operating said arm, a lamp secured within the arm at the free end thereof, means for energizing said lamp mounted within the arm, contact members on the arm connected with the lamp and said energizing means respectively, and a movable coacting contact member mounted on the support lying normally out of the path of the first-mentioned contact members and arranged to be brought into said path.

2. In an automobile signal, the combination of a support, a hollow indicator arm pivotally mounted on the support, means for operating said arm, a lamp secured within the arm at the free end thereof, means mounted within the arm for energizing said lamp, contact plates secured upon an outer side of the arm in spaced relation and connected with the lamp and the said energizing means, respectively, a movable contact plate mounted on the support, means for bringing said movable contact plate into the path of the first-mentioned contact plates, and means for preventing engagement between the several contact plates.

In testimony whereof I affix my signature.

JAMES K. PAYNE. [L. S.]